United States Patent
Cha et al.

(10) Patent No.: US 10,362,267 B2
(45) Date of Patent: Jul. 23, 2019

(54) IMAGE PROCESSING APPARATUS AND ELECTRONIC DEVICE INCLUDING THE SAME

(71) Applicant: SAMSUNG ELECTRONICS CO., LTD., Suwon-si (KR)

(72) Inventors: Kil Hyung Cha, Seoul (KR); Eyal Barneah, Kfar-Shmaryahu (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/837,643

(22) Filed: Dec. 11, 2017

(65) Prior Publication Data
US 2018/0227541 A1 Aug. 9, 2018

(30) Foreign Application Priority Data
Feb. 9, 2017 (KR) .................. 10-2017-0018106

(51) Int. Cl.
*H04N 5/06* (2006.01)
*H04N 7/08* (2006.01)

(52) U.S. Cl.
CPC ............. *H04N 7/0803* (2013.01); *H04N 5/06* (2013.01); *H04N 7/0806* (2013.01)

(58) Field of Classification Search
CPC ....... H04N 7/0803; H04N 7/0806; H04N 5/06
USPC .......................................................... 348/523
See application file for complete search history.

(56) References Cited

U.S. PATENT DOCUMENTS

| | | | |
|---|---|---|---|
| 6,750,904 B1 | 6/2004 | Lambert | |
| 8,059,174 B2 | 11/2011 | Mann et al. | |
| 8,744,420 B2 | 6/2014 | Cranfill et al. | |
| 9,001,227 B2 | 4/2015 | Aleksic et al. | |
| 9,197,821 B2 | 11/2015 | McMahon | |
| 2004/0066450 A1* | 4/2004 | Lee ...................... | H04N 13/161 348/51 |
| 2007/0127570 A1 | 6/2007 | Juri | |
| 2007/0183510 A1 | 8/2007 | Seong et al. | |
| 2011/0242355 A1* | 10/2011 | Goma .................. | H04N 5/2258 348/222.1 |
| 2016/0182874 A1 | 6/2016 | Richards et al. | |
| 2016/0227160 A1 | 8/2016 | Baek et al. | |

FOREIGN PATENT DOCUMENTS

JP 6-197378 A 7/1994

* cited by examiner

*Primary Examiner* — Michael Lee
(74) *Attorney, Agent, or Firm* — Sughrue Mion, PLLC

(57) ABSTRACT

An image processing apparatus and electronic device including the same are provided. The image processing apparatus includes a synchronizer configured to receive first frame data and second frame data, which is different from the first frame data, from an image sensor, a memory configured to receive at least part of the first frame data and at least part of the second frame data from the synchronizer and storing to store the received first frame data and the received second frame data, a line interleaving controller configured to output first line data, which is included in the first frame data stored in the memory, and second line data, which is included in the second frame data stored in the memory, through time division multiplexing, and an image signal processor configured to perform image processing, in units of lines, on the first line data and the second line data output by the line interleaving controller.

19 Claims, 10 Drawing Sheets

IMAGE PROCESSING APPARATUS AND ELECTRONIC DEVICE INCLUDING THE SAME

CROSS-REFERENCE TO RELATED APPLICATION

This application claims priority from Korean Patent Application No. 10-2017-0018106, filed on Feb. 9, 2017 in the Korean Intellectual Property Office, the disclosures of which are incorporated herein in their entireties by reference.

BACKGROUND

1. Field

The present disclosure relates to an image processing apparatus and an electronic device including the same, and more particularly, to an image processing apparatus capable of performing time division multiplexing on frame data in units of lines and an electronic device including the image processing apparatus.

2. Description of the Related Art

Electronic devices equipped with a plurality of image sensors are widely used due to the development of mobile devices such as a smart phone, a tablet personal computer (PC), and the like. An image processing apparatus may include a plurality of image sensors and a plurality of image signal processors corresponding to the plurality of image sensors, respectively, and the plurality of image signal processors may receive image data from the plurality of image sensors, respectively, and may perform image processing.

Alternatively, the image processing apparatus may include only one image signal processor, and the image signal processor may receive image data from each of the plurality of image sensors and perform image processing in a time division multiplexing manner, thereby saving the number of, and the area occupied by, semiconductor devices used.

In the meantime, image data is composed of a plurality of frames, and a method has been introduced in which image processing is performed by dividing each of the plurality of frames into lines in order to reduce delays in image processing.

SUMMARY

Exemplary embodiments of the present disclosure provide an image processing apparatus, which divides frame data into a plurality of line data and performs image processing on the plurality of line data through time division multiplexing with the aid of an image signal processor.

Exemplary embodiments of the present disclosure also provide an electronic device including an image processing apparatus, which divides frame data into a plurality of line data and performs image processing on the plurality of line data through time division multiplexing with the aid of an image signal processor.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an aspect of an exemplary embodiment, the image processing apparatus may include at least one synchronizer configured to receive first frame data and second frame data different from the first frame data, from at least one image sensor; a memory configured to receive at least part of the first frame data and at least part of the second frame data from the at least one synchronizer and to store the at least part of the first frame data and the at least part of the second frame data; a line interleaving controller configured to output first line data, which is included in the first frame data stored in the memory, and second line data, which is included in the second frame data stored in the memory, through time division multiplexing; and an image signal processor configured to perform image processing, in units of lines, on the first line data and the second line data that are output by the line interleaving controller.

According to an aspect of an exemplary embodiment, the electronic device may include a processor, a memory, and an image processing apparatus connected to the processor and the memory via a bus. The image processing apparatus may include at least one image sensor, at least one synchronizer, a line interleaving controller, and an image signal processor. The at least one synchronizer may be configured to receive first frame data and second frame data, which is different from the first frame data, from the image sensor and to provide at least part of the first frame data and at least part of the second frame data to the memory. The line interleaving controller may be configured to output first line data, which is included in the first frame data stored in the memory, and second line data, which is included in the second frame data stored in the memory, through time division multiplexing. The image signal processor may be configured to perform image processing, in units of lines, on the first line data and the second line data that are output by the line interleaving controller.

Other features and exemplary embodiments may be apparent from the following detailed description, the drawings, and the claims.

BRIEF DESCRIPTION OF THE DRAWINGS

The above and other exemplary embodiments and features of the present disclosure will become more apparent by describing in detail exemplary embodiments thereof with reference to the attached drawings, in which.

DETAILED DESCRIPTION

An image processing apparatus according to an exemplary embodiment of the present disclosure will hereinafter be described with reference to FIGS. 1 through 10.

The term "unit" or "block," as used herein, may refer to, but is not limited to, a software or hardware component or device, such as a field-programmable gate array (FPGA) or an application-specific integrated circuit (ASIC), which is designed to perform specific tasks. A unit or block may be configured to reside on an addressable storage medium and may be configured to execute on one or more processors. Thus, a unit or block may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided for in components and units/blocks may be combined into fewer components and units/blocks or further separated into additional components and units/blocks.

It will be apparent that though the terms first, second, third, etc. may be used herein to describe various members, components, regions, layers, sections, rows, columns, etc., these members, components, regions, layers, sections, rows, columns, etc. should not be limited by these terms. These terms are only used to distinguish one member, component, region, layer, section, row, column, etc. from another region, layer, section, row, column, etc. Thus, a first member, component, region, layer, section, row, column, etc. discussed below could be termed a second member, component, region, layer, section, row, column, etc. without departing from the teachings of the example embodiments.

Figure 1:
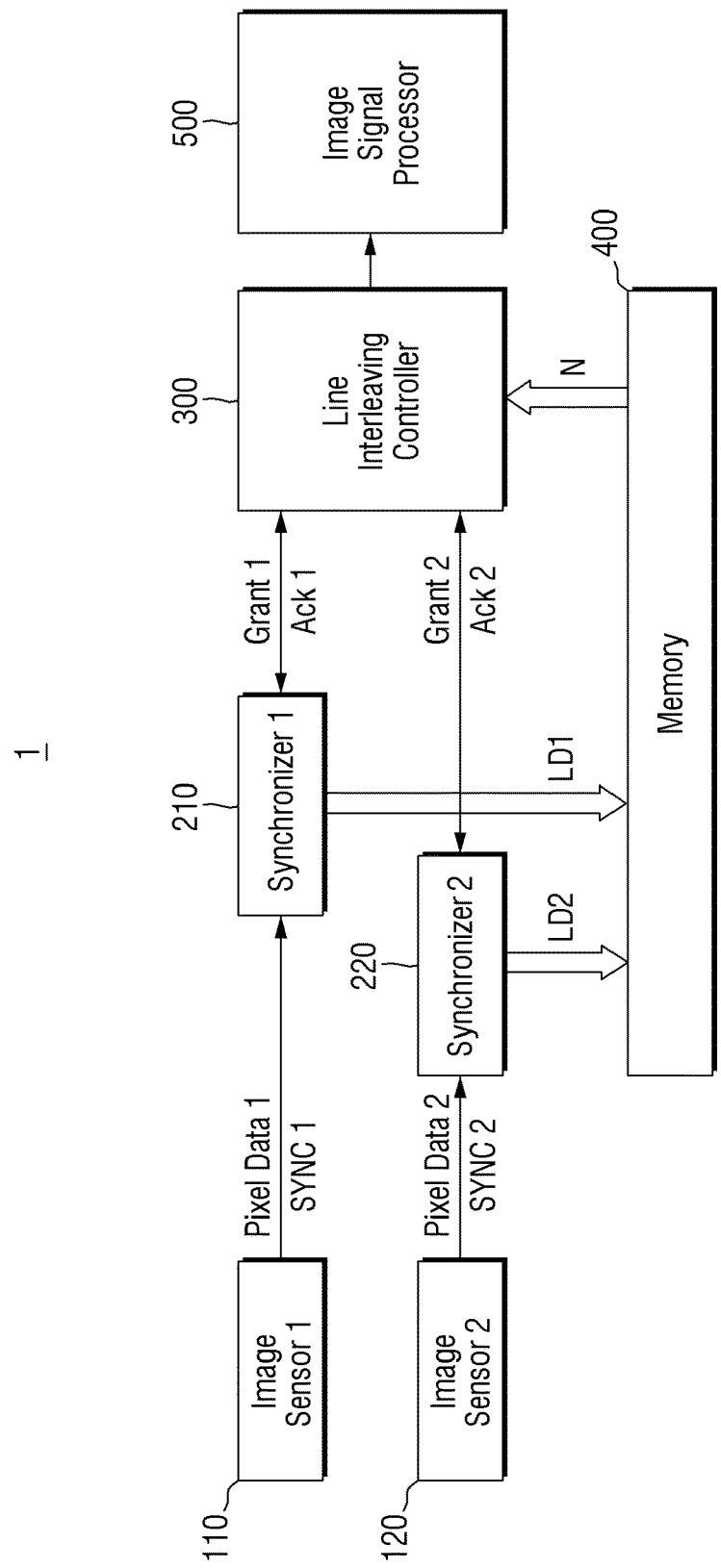
FIG. 1 is a block diagram illustrating an image processing apparatus according to an exemplary embodiment of the present disclosure.

FIG. 1 is a block diagram illustrating an exemplary operation of an image processing apparatus according to an exemplary embodiment of the present disclosure.

Referring to FIG. 1, an image processing apparatus 1 may include a first image sensor 110, a second image sensor 120, a first synchronizer 210, a second synchronizer 220, a line interleaving controller 300, a memory 400, and an image signal processor 500.

The first image sensor 110 may include, for example, a sensor array, which includes a plurality of unit pixels that are two-dimensionally arranged; a correlated double sampler, which samples an electrical output signal generated from an optical signal by the sensor array; an analog-to-digital converter, which converts an analog signal provided by the correlated double sampler into a digital signal; a latch, which outputs a digital signal; and a column decoder. The first image sensor 110 may be, for example, a complementary metal-oxide-semiconductor (CMOS) image sensor.

The first image sensor 110 may output pixel data from the column decoder and may provide the pixel data to the first synchronizer 210. Pixel data generated by the first image sensor 110 may form part of first frame data. Specifically, the first image sensor 110 may generate a plurality of pixel data, and may provide a plurality of pixel data that form a column of the first frame data when providing image data to the first synchronizer 210.

The image data provided by the first image sensor 110 may be image data having a first frame rate and a first resolution. The first frame rate may be, for example, any one of 30, 60, 120, and 240 frames per second (FPS), but the present disclosure is not limited thereto.

The first resolution may be, for example, any one of 1920×1080, 2560×1440, and 3840×2160, but the present disclosure is not limited thereto. That is, the resolution of the first frame data provided by the two-dimensional (2D) pixel array included in the first image sensor 110 may vary depending on the configuration of the first image sensor 110.

The second image sensor 120 may, for example, have the same structure as the first image sensor 110. That is, the second image sensor 120 may include, for example, a sensor array, which includes a plurality of unit pixels that are two-dimensionally arranged; a correlated double sampler, which samples an electrical output signal generated from an optical signal by the sensor array; an analog-to-digital converter, which converts an analog signal provided by the correlated double sampler into a digital signal; a latch, which outputs a digital signal; and a column decoder. The second image sensor 120 may be, for example, a CMOS image sensor.

The second image sensor 120 may output pixel data from the column decoder and may provide the pixel data to the second synchronizer 210. Pixel data generated by the second image sensor 120 may form part of second frame data. Specifically, the second image sensor 120 may generate a plurality of pixel data, and may provide a plurality of pixel data that form a column of the second frame data when providing image data to the second synchronizer 220.

The image data provided by the second image sensor 120 may be image data having a second frame rate and a second resolution. In some exemplary embodiments, the second frame rate and the second resolution may be different from the first frame rate and the first resolution, respectively, but the present disclosure is not limited thereto. For example, the second frame rate and the second resolution may be identical to the first frame rate and the first resolution, respectively.

The image processing apparatus 1 may include two image sensors, i.e., the first and second image sensors 110 and 120, and two synchronizers corresponding to the two image sensors, respectively, i.e., the first and second synchronizers 210 and 220, as illustrated in FIG. 1, but the present disclosure is not limited thereto. The image processing apparatus 1 may include n image sensors and n synchronizers corresponding to the n image sensors, respectively, where n is a natural number. In the description that follows, it is assumed that the image processing apparatus 1 includes two image sensors (i.e., the first and second image sensors 110 and 120) and two synchronizers (i.e., the first and second synchronizers 210 and 220).

In a case where the image processing apparatus 1 is a mobile device such as a smartphone, the first image sensor 110 may be a rear camera sensor, and the second image sensor 120 may be a front camera sensor. Alternatively, the first image sensor 110 may be a front camera sensor, and the second image sensor 120 may be a rear camera sensor.

Figure 2:
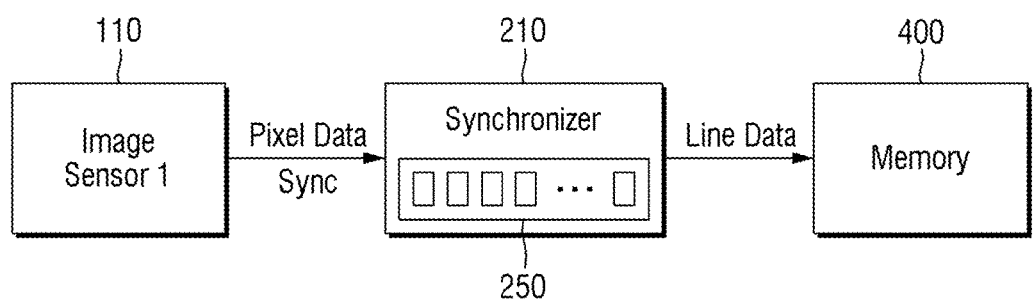
FIG. 2 is a block diagram illustrating an exemplary operation of a first synchronizer of the image processing apparatus according to the exemplary embodiment of FIG. 1.

FIG. 2 is a block diagram illustrating an operation of the first synchronizer of the image processing apparatus according to the exemplary embodiment of FIG. 1.

Referring to FIG. 2, the first synchronizer 210 may receive first frame data from the first image sensor 110. Specifically, the first synchronizer 210 may receive a plurality of pixel data that form the first frame data from the first image sensor 110 and may generate first line data LD1. The first synchronizer 210 may include a memory 250, which stores the pixel data provided by the first image sensor 110. The first synchronizer 210 may sequentially store a plurality of pixel data included in a row of the first frame data provided by the first image sensor 110 in the memory 250 and may generate the first line data LD1 using the stored pixel data. The first line data LD1 may form a row of the first frame data.

The memory 250 of the first synchronizer 210 may be, for example, a first-in first-out (FIFO) memory or a static random access memory (SRAM), but the present disclosure is not limited thereto.

The first synchronizer 210 may generate the first line data LD1 and may transmit the first line data LD1 to the memory 400. The first synchronizer 210 may transmit a predefined amount of first line data LD1 to the memory 400. The predefined amount of first line data LD1 may include pixel data from different rows of the first frame data. The transmission of the first line data LD1 to the memory 400 by the first synchronizer 210 will be described later in further detail.

Referring again to FIG. 1, the second synchronizer 220 may receive second frame data from the second image sensor 120. Specifically, the second synchronizer 220 may receive a plurality of pixel data that form the second frame data from the second image sensor 120 and may generate second line data LD2. The second synchronizer 220 may include a memory for storing the pixel data received from the second image sensor 120. The second synchronizer 220 may sequentially store, in its memory, a plurality of pixel data included in a row of the second frame data provided by the second image sensor 120 and may generate the second line data LD2 using the stored pixel data. The second line data LD2 may form a row of the second frame data.

The second synchronizer 220 may generate the second line data LD2 and may transmit the second line data LD2 to the memory 400. The second synchronizer 220 may transmit a predefined amount of second line data LD2 to the memory 400. The predefined amount of second line data LD2 may include pixel data from different columns of the second frame data. The transmission of the second line data LD2 to the memory 400 by the second synchronizer 220 will be described later in further detail.

As described above, the first resolution of the first frame data and the second resolution of the second frame data may differ from each other. Thus, the size of the first line data LD1 forming the first frame data and the size of the second line data LD2 forming the second frame data may differ from each other.

Also, as described above, the first frame rate of the image data provided by the first image sensor 110 and the second frame rate of the image data provided by the second image sensor 120 may differ from each other. Thus, the interval at which the first frame data and the first line data LD1 of the first frame data are provided to the first synchronizer 210 by the first image sensor 110 may differ from the interval at which the second frame data and the second line data LD2 of the second frame data are provided to the second synchronizer 220 by the second image sensor 120.

Figure 3:
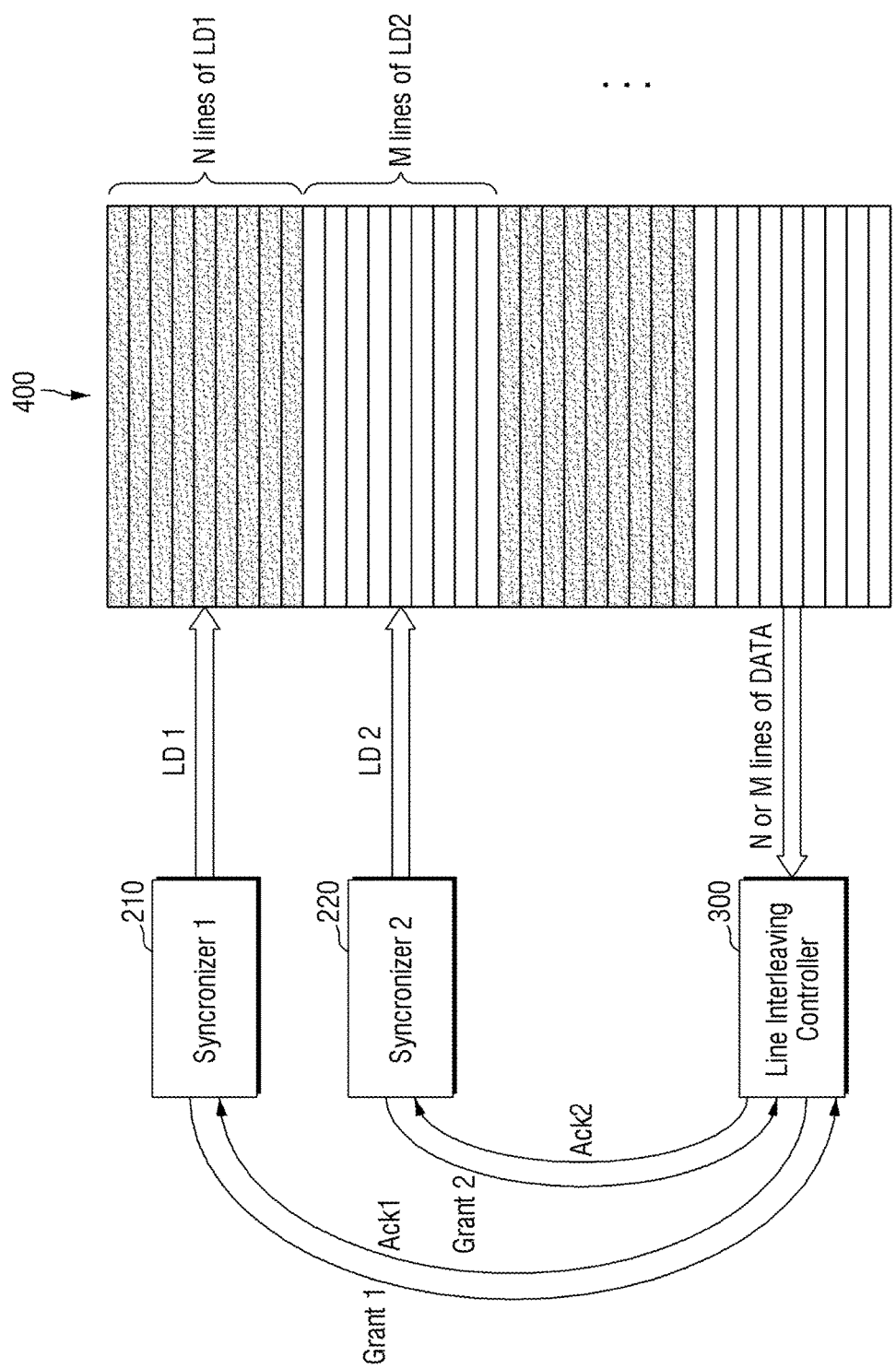
FIG. 3 is a block diagram illustrating how the synchronizers of the image processing apparatus according to the exemplary embodiment of FIG. 1 store line data in a memory.

FIG. 3 is a block diagram illustrating how the synchronizers of the image processing apparatus according to the exemplary embodiment of FIG. 1 store line data in a memory.

Referring to FIG. 3, the first and second synchronizers 210 and 220, which are included in the image processing apparatus 1, may generate first line data LD1 and second line data LD2, respectively, and may transmit the first line data LD1 and the second line data LD2, respectively, to the memory 400.

Specifically, as mentioned above, the first synchronizer 210 may generate the first line data LD1 using a plurality of pixel data provided by the first image sensor 110. The first synchronizer 210 transmits the first line data LD1 to the memory 400. Since the first frame data continues to be provided from the first image sensor 110, the first synchronizer 210 can sequentially provide a plurality of first line data LD1 to the memory 400.

The first synchronizer 210 may be connected to the memory 400 through direct memory access (DMA). Thus, the first synchronizer 210 can write the first line data LD1 to the memory 400 by directly accessing an address in the memory 400 at which to store the first line data LD1 without intervention of, for example, a central processing unit (CPU).

Similarly, as mentioned above, the second synchronizer 220 generates the second line data LD2 using a plurality of pixel data provided by the second image sensor 120 and transmits the second line data LD2 to the memory 400. Since the second frame data continues to be provided from the second image sensor 120, the second synchronizer 220 can sequentially provide a plurality of second line data LD2 to the memory 400.

The second synchronizer 220 may be connected to the memory 400 through DMA. Thus, the second synchronizer 220 can write the second line data LD2 to the memory 400 by directly accessing an address in the memory 400 at which to store the second line data LD2 without intervention of the CPU.

In some exemplary embodiments, the interval at which the first line data LD1 is provided to the memory 400 by the first synchronizer 210 may differ from the interval at which the second line data LD2 is provided to the memory 400 by the second synchronizer 220.

The memory 400 may store a plurality of line data LD1 provided by the first synchronizer 210 and a plurality of line data LD2 provided by the second synchronizer 220. In some exemplary embodiments, the memory 400 may store (e.g., write) both the plurality of first line data LD1 and the plurality of second line data LD2 at the same time. The memory 400 may provide the plurality of first line data LD1 and the plurality of second line data LD2 to the line interleaving controller 300 upon request from the line interleaving controller 300. The memory 400 may be connected to the first and second synchronizers 210 and 220 and the line interleaving controller 300 through DMA. That is, the image processing apparatus 1 may further include a bus, which connects the first and second synchronizers 210 and 220, the line interleaving controller 300, and the memory 400.

In some exemplary embodiments, the memory 400 may be a dynamic random access memory (DRAM), but the present disclosure is not limited thereto. In a case in which the memory 400 is a DRAM, the memory 400 may be packaged into a different semiconductor chip from, or the same semiconductor chip as, the first and second image sensors 110 and 120 and the first and second synchronizers 210 and 220.

The first synchronizer 210 transmits a predefined amount of first line data LD1 to the memory 400 and provides a first grant signal "Grant 1" to the line interleaving controller 300. In response to the receipt of the first grant signal "Grant 1," the line interleaving controller 300 may provide a first acknowledgment signal "Ack 1" to the first synchronizer 210. Also, the line interleaving controller 300 may access the memory 400 to read the predefined amount of first line data LD1 from the memory 400.

In some exemplary embodiments, the line interleaving controller 300 may transmit the first acknowledgment signal "Ack 1" after reading the first line data LD 1 from the memory 400, and the first synchronizer 210 may continue to transmit the first line data LD1 to the memory 400 without receiving the first acknowledgement signal "Ack 1" from the line interleaving controller 300.

The line interleaving controller 300 may transmit the predefined amount of first line data LD1 read from the memory 400 to the image signal processor 500. Specifically, the line interleaving controller 300 may sequentially transmit a plurality of first line data LD1 to the image signal processor 500 through time division multiplexing.

The second synchronizer 220 transmits a predefined amount of second line data LD2 to the memory 400 and provides a second grant signal "Grant 2" to the line interleaving controller 300. In response to the receipt of the second grant signal "Grant 2," the line interleaving controller 300 may provide a second acknowledgment signal "Ack 2" to the second synchronizer 220. Also, the line interleaving controller 300 may access the memory 400 to read the predefined amount of second line data LD2 from the memory 400.

In some exemplary embodiments, the line interleaving controller 300 may transmit the second acknowledgment signal "Ack 2" after reading the second line data LD 2 from the memory 400, and the second synchronizer 220 may continue to transmit the second line data LD2 to the memory 400 without receiving the second acknowledgement signal "Ack 2" from the.

The line interleaving controller 300 may transmit the predefined amount of second line data LD2 read from the memory 400 to the image signal processor 500. Specifically, the line interleaving controller 300 may sequentially transmit a plurality of second line data LD2 to the image signal processor 500 through time division multiplexing.

The operations of the first and second synchronizer 210 and 220, the line interleaving controller 300, and the memory 400 will hereinafter be described with reference to FIG. 4.

Figure 4:
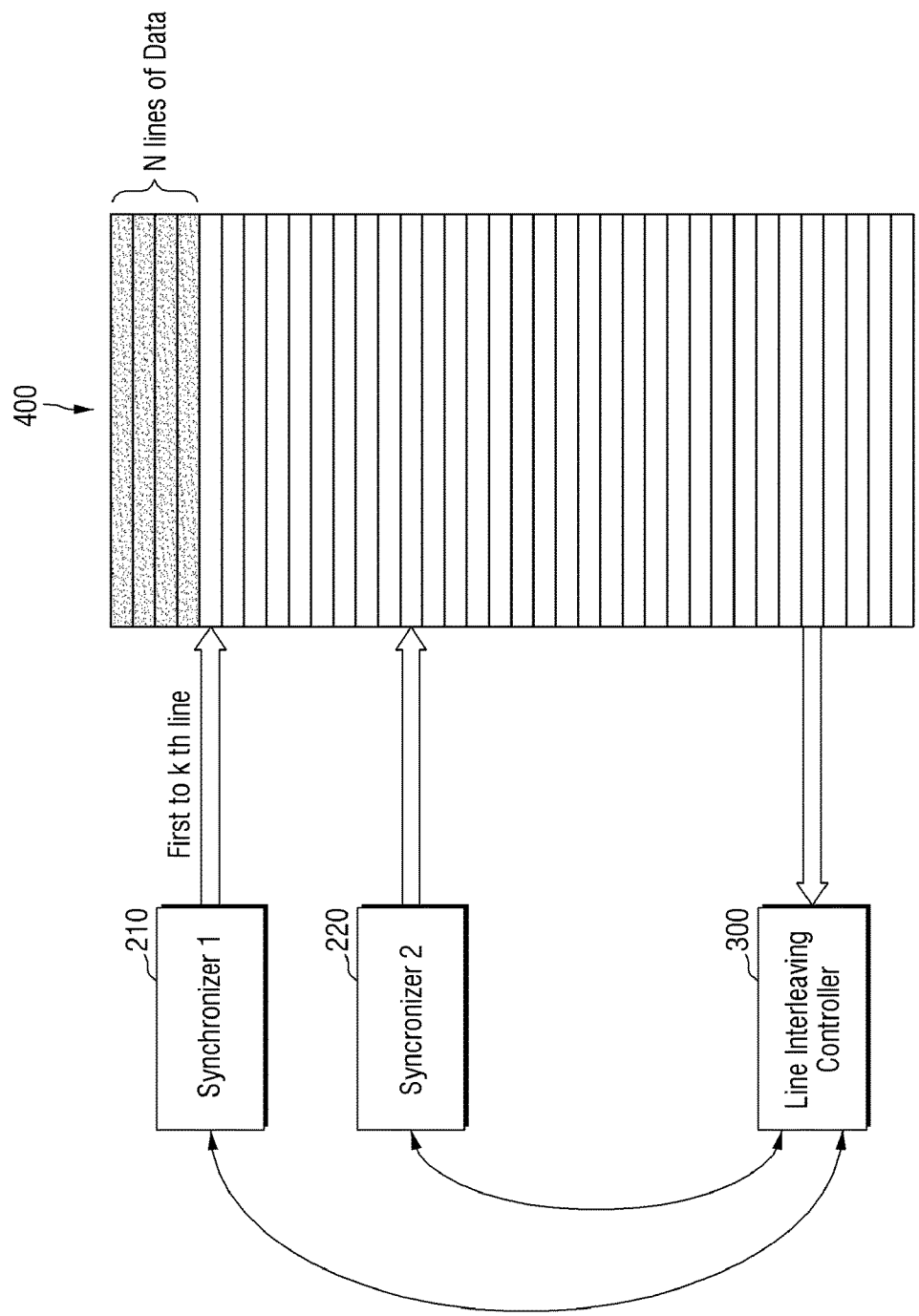
FIGS. 4 and 5 are block diagrams illustrating operations of the synchronizers, the memory, and the line interleaving controller of the image processing apparatus according to the exemplary embodiment of FIG. 1.
Figure 5:
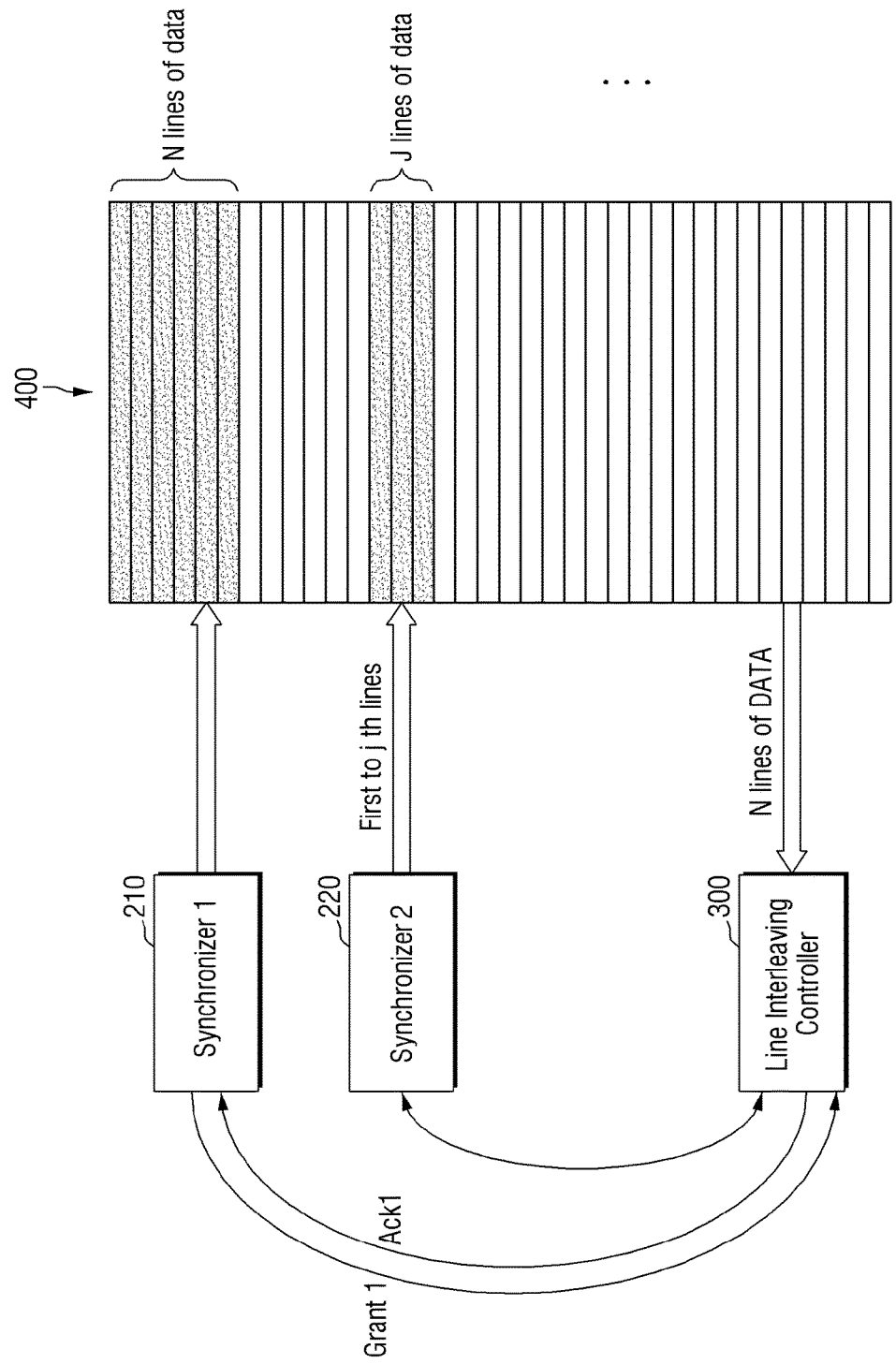

FIGS. 4 and 5 are block diagrams illustrating the operations of the first and second synchronizers 210 and 220, the line interleaving controller 300, and the memory 400 of the image processing apparatus 1.

Referring to FIGS. 4 and 5, the transmission of a predefined amount of first line data (for example, N lines of first line data) that form first frame data from the first synchronizer 210 to the memory 400 begins. First, referring to FIG. 4, k lines of first line data LD1 (where k is a natural number of at least 1 and less than N) are transmitted from the first synchronizer 210 to the memory 400. FIG. 4 illustrates that the transmission of second line data LD2 from the second synchronizer 220 to the memory 400 is not performed during the transmission of the first line data LD1 from the first synchronizer 210 to the memory 400, but the present disclosure is not limited thereto. That is, the transmission of the first line data LD1 from the first synchronizer 210 to the memory 400 and the transmission of the second line data LD1 from the second synchronizer 220 to the memory 400 may be performed concurrently.

In some exemplary embodiments, the line interleaving controller 300 may access the memory 400 through DMA to read the first or second line data LD1 or LD2 from the memory 400. The first or second synchronizer 210 or 220 may operate as a DMA master, and the line interleaving controller 300, which performs a read operation in response to the receipt of a grant signal from the DMA master, i.e., the first or second synchronizer 210 or 220, may operate as a DMA slave.

FIG. 5 illustrates that the first synchronizer 210 completes the transmission of the N lines of first line data LD1 to the memory 400 and then provides the first grant signal "Grant 1" to the line interleaving controller 300. In response to the receipt of the first grant signal "Grant 1," the line interleaving controller 300 may provide the first acknowledgement signal "Ack 1" to the first synchronizer 210 and may read N lines of first line data LD1 from the memory 400. The line interleaving controller 300 may sequentially transmit the N lines of first line data LD1 to the image signal processor 500 through time division multiplexing.

The second synchronizer 220 begins to transmit a predefined amount of second line data (for example, M lines of second line data) that form second frame data to the memory 400. FIG. 5 illustrates that the second synchronizer 220 transmits j lines of second line data LD2 (where j is a natural number of at least 1 and less than M) to the memory 400. The first line data LD1 and the second line data LD2 may be stored in separate regions in the memory 400. Once the transmission of the M second line data LD2 is completed, the second synchronizer 300 may provide the second grant signal "Grant 2" to the line interleaving controller 300. The line interleaving controller 300 may provide the second acknowledgement signal "Ack 2" to the second synchronizer 220 and may read M lines of second line data LD2 from the memory 400. The line interleaving controller 300 may sequentially transmit the M lines of second line data LD2 to the image signal processor 500 through time division multiplexing.

The second grant signal "Grant 2" may be provided from the second synchronizer 220 to the line interleaving controller 300 during the transmission of N lines of first line data LD1 from the memory 400 to the line interleaving controller 300. In this case, the line interleaving controller 300 may postpone reading second line data LD2 until the reading of first line data LD1 is completed, but the present disclosure is not limited thereto. Once the reading of first line data LD1 is completed, the line interleaving controller 300 may read M second line data LD2 and may transmit the read M lines of second line data LD2 to the image signal processor 500. Then, the line interleaving controller 300 may begin to read second line data LD2 during the reading of first line data LD1, if necessary.

Similarly, the first grant signal "Grant 1" may be provided from the first synchronizer 210 to the line interleaving controller 300 during the transmission of M lines of second line data LD2 from the memory 400 to the line interleaving controller 300. In this case, the line interleaving controller 300 may postpone reading first line data LD1 until the reading of second line data LD2 is completed, but the present disclosure is not limited thereto. Once the reading of second line data LD2 is completed, the line interleaving controller 300 may read N lines of first line data LD1 and may transmit the N lines first line data LD1 to the image signal processor 500. Then, the line interleaving controller 300 may begin to read first line data LD1 during the reading of second line data LD2, if necessary.

Figure 6:
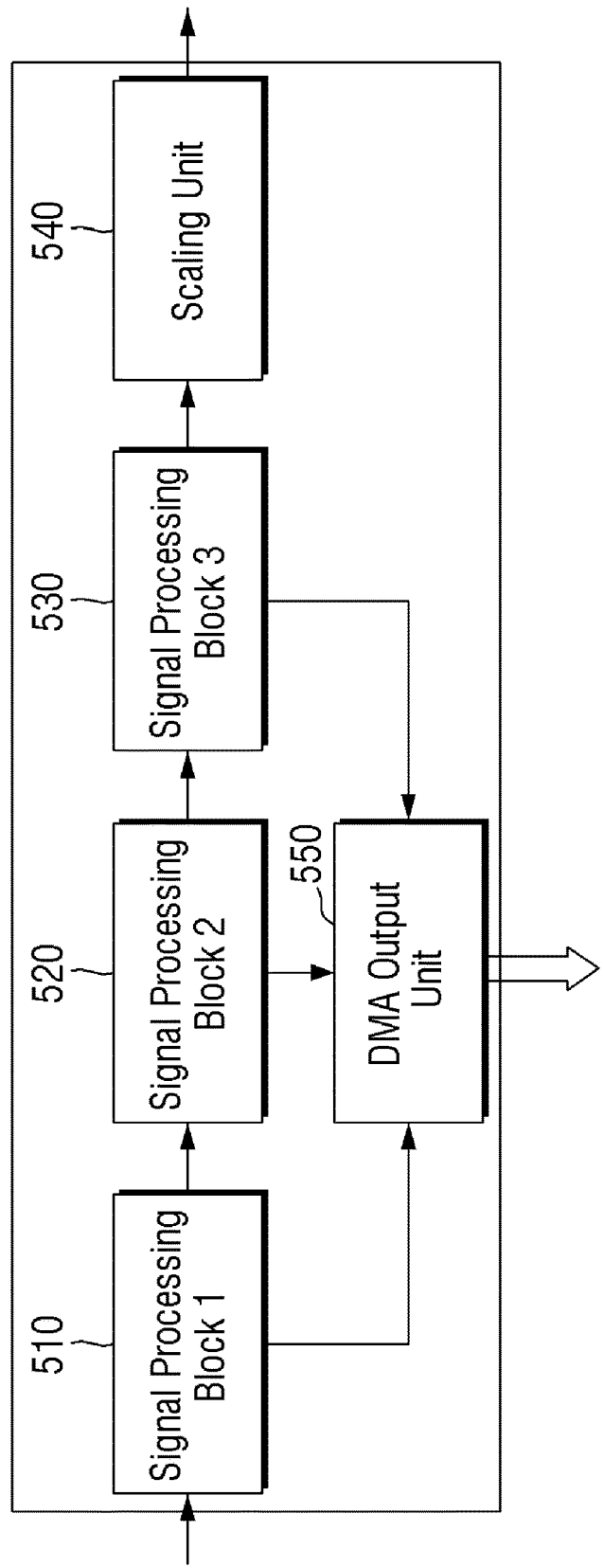
FIG. 6 is a block diagram illustrating an image signal processor of the image processing apparatus according to the exemplary embodiment of FIG. 1.

FIG. 6 is a block diagram illustrating the image signal processor 500 of the image processing apparatus 1.

Referring to FIG. 6, the image signal processor 500 may include first, second, and third signal processing blocks 510, 520, and 530, a scaling unit 540, and a DMA output unit 550.

The image signal processor 500 may receive a plurality of first line data LD1 and a plurality of second line data LD2 from the line interleaving controller 300 through time division multiplexing. That is, the image signal processor 500 may sequentially receive, on a line-by-line basis, a plurality of first line data LD1 or a plurality of second line data LD2 read from the memory 400 by the line interleaving controller 300.

FIG. 6 illustrates the image signal processor 500 as including three signal processing blocks, i.e., the first, second, and third signal processing blocks 510, 520, and 530, but the present disclosure is not limited thereto. For example, the image signal processor 500 may include greater or fewer number of signal processing blocks than three. The first, second, and third signal processing blocks 510, 520, and 530 may perform automatic exposure, automatic white balance, and noise cancellation, respectively, but the present disclosure is not limited thereto. The first, second, and third signal processing blocks 510, 520, and 530 may perform image processing such as exposure control on first or second line data LD1 or LD2 on a line-by-line basis and may provide the resulting line data to their respective subsequent signal processing blocks.

The first, second, and third signal processing blocks 510, 520, and 530 may also provide the line data obtained by performing image processing on the first or second line data LD1 or LD2 to the DMA output unit 550. The DMA output unit 550 may store the line data obtained by performing image processing on the first or second line data LD1 or LD2 in a frame buffer. In some exemplary embodiments, the frame buffer may be provided in the memory 400. That is, the first line data LD1 and the second line data LD2 provided by the first synchronizer 210 and the second synchronizer 220, respectively, and the frame buffer may all be provided in the same memory 400.

The scaling unit 540 may perform scaling on data output by the third signal processing block 530. That is, the scaling unit 540 may scale up or down the data output by the third signal processing block 530 and may output the scaled-up or scaled-down data.

As a result, the image processing apparatus 1 can perform image processing using the image signal processor 500 through the time-division multiplexing of a plurality of frame data provided by the first and second image sensors 110 and 120. Specifically, the image processing apparatus 1 can perform image processing on data received in units of lines, instead of performing image processing on frame data, before the transmission of the frame data is completed.

Also, the memory 400 of the image processing apparatus 1 can store at least some of a plurality of frame data. That is, a plurality of frame data generated by each of the first and image sensors 110 and 120 may be stored in the memory 400, which includes, for example, a DRAM, depending on the structure of the memory 400. Accordingly, the possibility that the frame data generated by each of the first and second image sensors 110 and 120 is lost due to the limited storage capacity of the memory 400 may be reduced.

Figure 7:
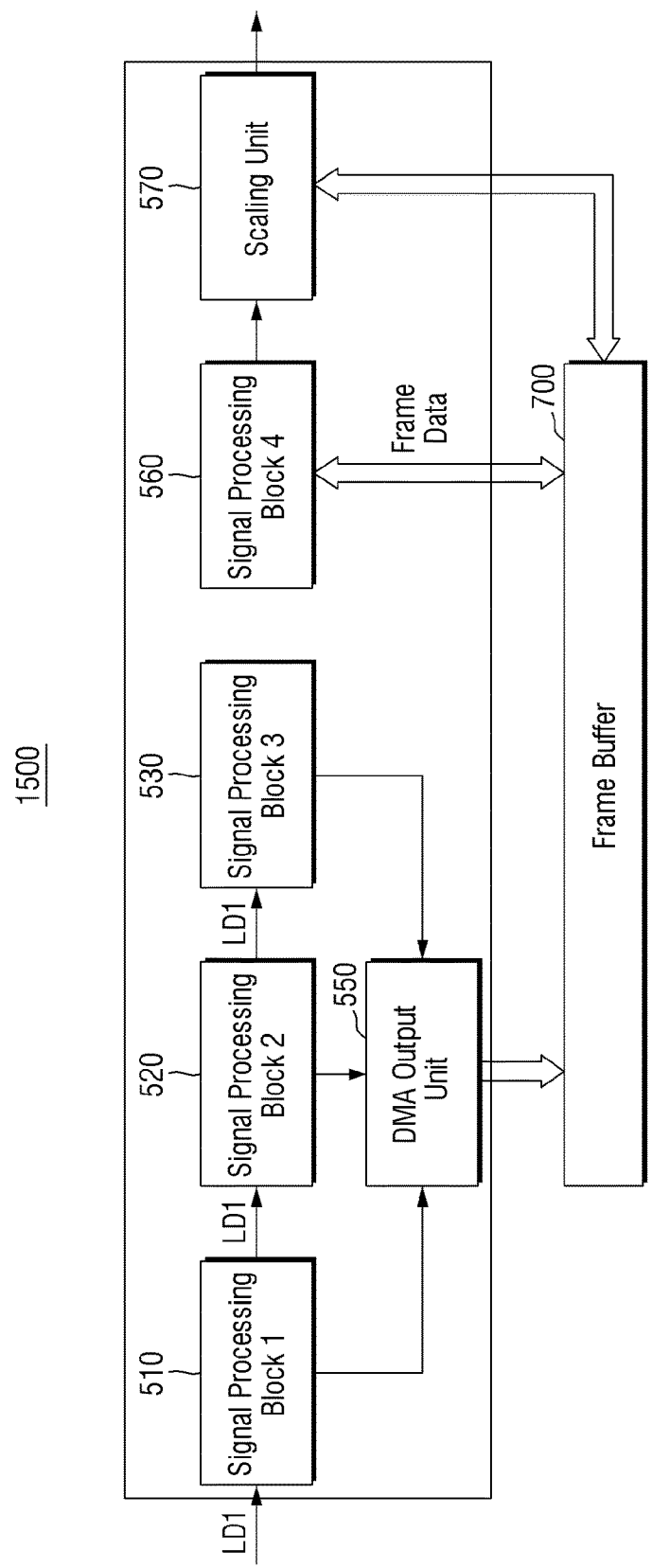
FIG. 7 is a block diagram illustrating an image signal processor of an image processing apparatus according to another exemplary embodiment of the present disclosure.

FIG. 7 is a block diagram illustrating an image signal processor of an image processing apparatus according to another exemplary embodiment of the present disclosure. The image signal processor of the image processing apparatus according to the exemplary embodiment of FIG. 7 will hereinafter be described, focusing mainly on differences with the image signal processor 500 of the image processing apparatus 1.

Referring to FIG. 7, an image signal processor 1500 may include first, second, and third signal processing blocks 510, 520, and 530 and may further include a fourth signal processing block 560.

The fourth signal processing block 560 may operate in a different manner from the first, second, and third signal processing blocks 510, 520, and 530. That is, the first, second, and third signal processing blocks 510, 520, and 530 may receive and perform signal processing on first or second line data LD1 or LD2 in units of lines, whereas the fourth signal processing block 560 may perform signal processing on first or second frame data in units of frames.

That is, the first, second, and third signal processing blocks 510, 520, and 530 may perform signal processing on the first or second line data LD1 or LD2 and may store the resulting line data in a frame buffer 700 via a DMA output unit 550. The line data obtained from signal processing performed by the first, second, and third signal processing blocks 510, 520, and 530 may be stored in the frame buffer 700 in units of frames, rather than in units of lines.

The fourth signal processing block 560 may perform signal processing on frame data provided by the frame buffer 700 and may provide the resulting frame data to the scaling unit 570.

That is, the signal processor 1500 may include not only the first, second, and third signal processing blocks 510, 520, and 530, which receive, and perform signal processing on, image data in units of lines, but also the fourth signal processing block 560, which receives, and performs signal processing on, image data in units of frames.

Figure 8:
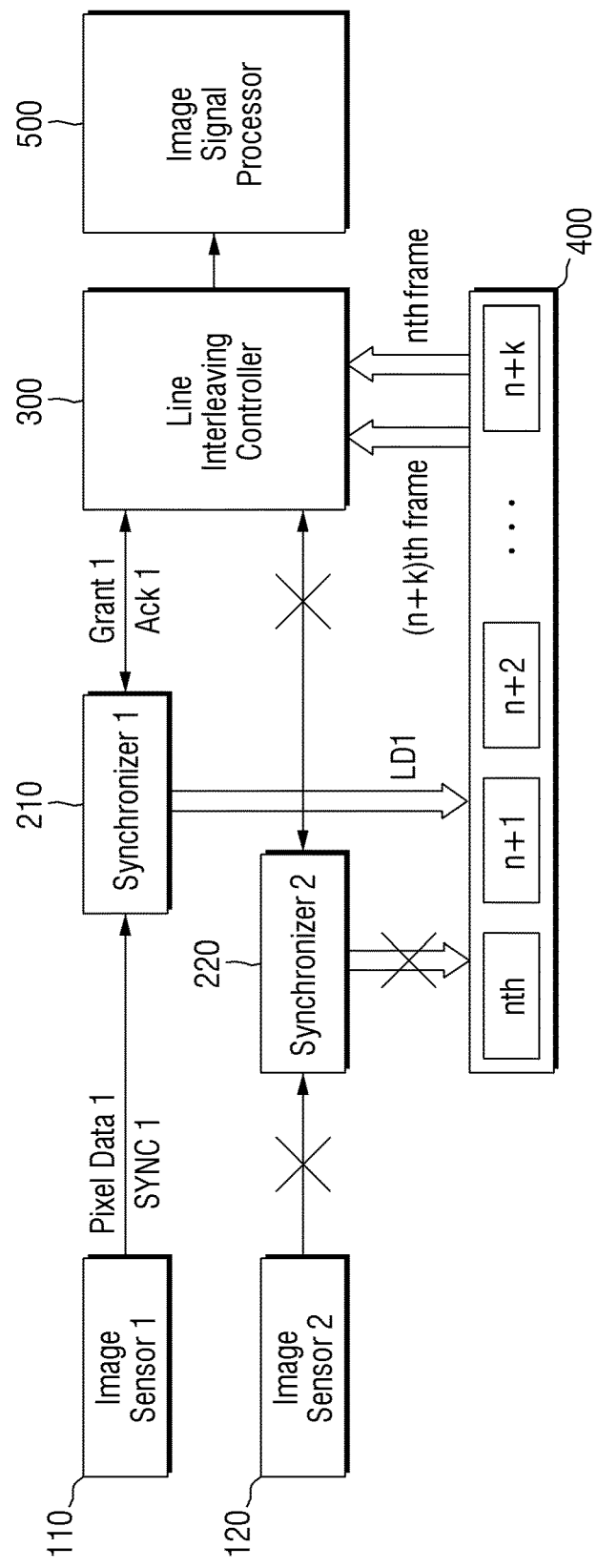
FIG. 8 is a block diagram illustrating an exemplary operation of the image processing apparatus according to the exemplary embodiment of FIG. 1.

FIG. 8 is a block diagram illustrating an exemplary operation of the image processing apparatus according to the exemplary embodiment of FIG. 1.

Referring to FIG. 8, the image processing apparatus 1 may perform image processing using n-th frame data and (n+k)-th frame data provided by the first image sensor 110. The (n+k)-th frame data may be image data created later in time than the n-th frame data.

That is, generally, the first and second image sensors 110 and 120 both operate to store pixel data in the memory 400 via the first and second synchronizers 210 and 220. In this case, there may be the need to perform image processing according to user input or an external signal with reference to frame data, including pixel data previously generated by the first or second image sensor 110 or 120.

Accordingly, the image processing apparatus 1 may stop the operation of the second image sensor 120 and may provide the n-th frame data generated by the first image sensor 110 and the (n+k)-th frame data stored in the memory 400 to the line interleaving controller 300. The line interleaving controller 300 may divide each of the n-th frame data and the (n+k)-th frame data into a plurality of line data and may transmit the line data to the image signal processor 500 through time division multiplexing. The image signal processor 500 may perform signal processing on the line data and may output the resulting line data.

Figure 9:
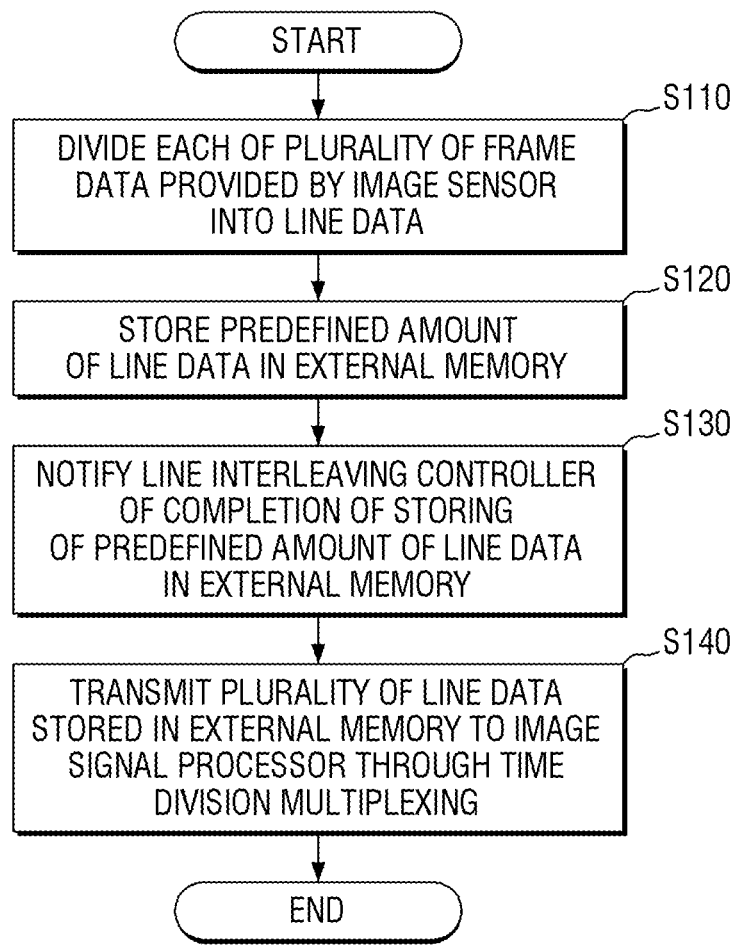
FIG. 9 is a flowchart illustrating an operation of an image processing apparatus according to an exemplary embodiment of the present disclosure.

FIG. 9 is a flowchart illustrating an operation of an image processing apparatus according to an exemplary embodiment of the present disclosure.

Referring to FIG. 9, an image processing apparatus divides each of a plurality of frame data provided by an image sensor into a plurality of lines (S110) and stores a predefined amount (e.g., lines) of line data, among the plurality of line data, in an external memory (S120). Then, if the storing of the predefined amount of line data in the external memory is completed, the image processing apparatus notifies a line interleaving controller of the completion of the storing of the predefined amount of line data in the external memory (S130), and transmits the predefined amount of line data stored in the external memory to an image signal processor through time division multiplexing (S140).

Figure 10:
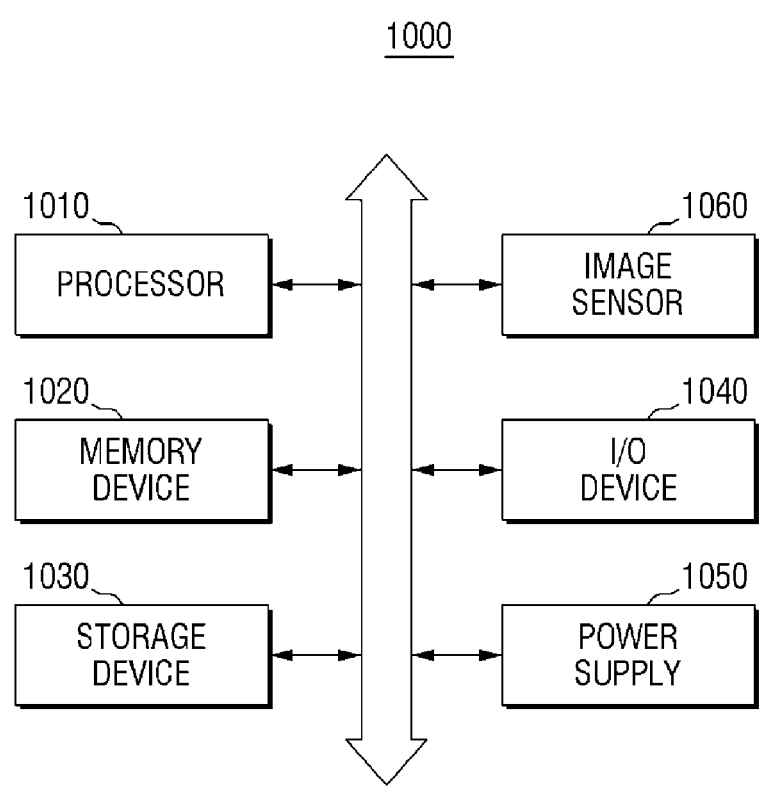
FIG. 10 is a block diagram illustrating an electronic device including an image processing apparatus according to an exemplary embodiment of the present disclosure.

FIG. 10 is a block diagram illustrating an electronic device including an image processing apparatus according to an exemplary embodiment of the present disclosure.

Referring to FIG. 10, an electronic device 1000 includes an image signal processor 1010, a memory device 1020, a storage device 1030, an input/output (I/O) device 1040, a power supply 1050, and an image sensor 1060.

The image sensor 1060 may use an offset-compensated reference voltage as a reference voltage for analog-to-digital conversion. The electronic device 1000 may further include ports or channels for allowing the electronic device 1000 to communicate with a video card, a sound card, a memory card, a Universal Serial Bus (USB) device, or another electronic device.

The image signal processor 1010 may perform certain computation or tasks. The image signal processor 1010 may be a micro-processor or a CPU.

The image signal processor 1010 may communicate with the memory device 1020, the storage device 1030, and the I/O device 1040 via an address bus, a control bus, and/or a data bus.

The image signal processor 1010 may be connected to an expansion bus such as a Peripheral Component Interconnect (PCI) bus.

The memory device 1020 may store data necessary for the operation of the electronic device 1000. The memory device 1020 may store line data provided by the image sensor 1060 in connection with the operation of any one of the image processing apparatuses according to the aforementioned exemplary embodiments of the present disclosure, and a frame buffer may be provided in the memory device 1020.

For example, the memory device 1020 may be implemented as a DRAM, a mobile DRAM, a SRAM, a phase-change random access memory (PRAM), a ferroelectric random access memory (FRAM), a resistive random access memory (RRAM), and/or a magnetoresistive random access memory (MRAM) and may be integrated into the same chip as, or a different chip from, the image signal processor 1010. The storage device 1030 may include a solid-state drive (SSD), a hard disk drive (HDD), or a compact disc read-only memory (CD-ROM).

The I/O device 1040 may include input means such as a keyboard, a keypad, a mouse, or the like, and output means such as a printer, a display, or the like. The power supply 1050 may supply an operating voltage necessary for the operation of the electronic device 1000.

The image sensor 1060 may be connected to the image signal processor 1010 via a bus or a communication link. The image sensor 1060 may operate in the same manner as any one of the image processing apparatuses according to the aforementioned exemplary embodiments of the present disclosure.

The image sensor 1060 may be integrated into the same chip as, or a different chip from, the image signal processor 1010.

The electronic device 1000 may be interpreted as being any type of computing system using an image sensor. For example, the electronic device 1000 may be a digital camera, a mobile phone, a smart phone, a tablet PC, or the like.

The embodiments of the present disclosure have been described with reference to the attached drawings, but it may be understood by one of ordinary skill in the art that the present disclosure may be performed one of ordinary skill in the art in other specific forms without changing the technical concept or essential features of the present disclosure. Further, the above-described embodiments are merely examples and do not limit the scope of the rights of the present disclosure.

What is claimed is:

1. An image processing apparatus, comprising:
at least one synchronizer configured to receive first frame data and second frame data different from the first frame data, from at least one image sensor;
a memory configured to receive at least part of the first frame data and at least part of the second frame data from the at least one synchronizer and to store the at least part of the first frame data and the at least part of the second frame data;
a line interleaving controller configured to output first line data, which is included in the first frame data stored in the memory, and second line data, which is included in the second frame data stored in the memory, through time division multiplexing; and
an image signal processor configured to perform image processing, in units of lines, on the first line data and the second line data that are output by the line interleaving controller,
wherein the second frame data is created by a same image sensor as the first frame data at a first time later than a second time at which the first frame data is created.

2. The image processing apparatus of claim 1, wherein the at least one image sensor comprises a first image sensor, which is configured to generate the first frame data, and a second image sensor, which is configured to generate the second frame data.

3. An image processing apparatus comprising:
at least one synchronizer configured to receive first frame data and second frame data different from the first frame data, from at least one image sensor;
a memory configured to receive at least part of the first frame data and at least part of the second frame data from the at least one synchronizer and to store the at least part of the first frame data and the at least part of the second frame data;
a line interleaving controller configured to output first line data, which is included in the first frame data stored in the memory, and second line data, which is included in the second frame data stored in the memory, through time division multiplexing; and
an image signal processor configured to perform image processing, in units of lines, on the first line data and the second line data that are output by the line interleaving controller,
wherein the at least one image sensor comprises a first image sensor, which is configured to generate the first frame data, and a second image sensor, which is configured to generate the second frame data,
wherein the first image sensor is further configured to generate the first frame data with a first frame rate, and
wherein the second image sensor is further configured to generate the second frame data with a second frame rate, which is different from the first frame rate.

4. The image processing apparatus of claim 2, wherein the at least one synchronizer comprises a first synchronizer, which is configured to receive the first frame data from the first image sensor, and a second synchronizer, which is configured to receive the second frame data from the second image sensor.

5. The image processing apparatus of claim 2, wherein the at least one synchronizer is configured to provide a predefined amount of the first line data to the memory, and transmit a grant signal to the line interleaving controller.

6. The image processing apparatus of claim 5, wherein the line interleaving controller is further configured to receive the grant signal and to read the predefined amount of the first line data from the memory.

7. The image processing apparatus of claim 1, wherein the first frame data has a first resolution, and
wherein the second frame data has a second resolution, which is one of identical to and different from the first resolution.

8. The image processing apparatus of claim 1, wherein the line interleaving controller is further configured to access the memory through direct memory access (DMA).

9. The image processing apparatus of claim 1, wherein the memory comprises a dynamic random access memory (DRAM).

10. An electronic device, comprising:
a processor;
a memory; and
an image processing apparatus connected to the processor and the memory via a bus, the image processing apparatus comprising:
at least one image sensor,
at least one synchronizer configured to receive first frame data and second frame data, which is different from the first frame data, from the at least one image sensor, and provide at least part of the first frame data and at least part of the second frame data to the memory,
a line interleaving controller configured to output first line data, which is included in the first frame data stored in the memory, and second line data, which is included in the second frame data stored in the memory, through time division multiplexing, and
an image signal processor configured to perform image processing, in units of lines, on the first line data and the second line data that are output by the line interleaving controller,
wherein the second frame data is created by a same image sensor as the first frame data at a first time later than a second time at which the first frame data is created.

11. The electronic device of claim 10, wherein the at least one image sensor comprises a first image sensor, which is configured to generate the first frame data, and a second image sensor, which is configured to generate the second frame data.

12. The electronic device of claim 11, wherein the at least one synchronizer is configured to include a first synchronizer, which is configured to receive the first frame data from the first image sensor, and a second synchronizer, which is configured to receive the second frame data from the second image sensor.

13. The electronic device of claim 10, wherein the memory includes a dynamic random access memory (DRAM).

14. The electronic device of claim 10, wherein the image processing apparatus is configured to access the memory without intervention of the processor.

15. A method comprising:
sequentially storing, in a first synchronizer, a first row of a first frame data generated by a first image sensor;
generating a first line data based on the first row of the first frame data stored in the first synchronizer;
writing, in a memory by the first synchronizer, the first line data and transmitting a first grant signal to a line interleaving controller;
upon receiving the first grant signal, reading, by the line interleaving controller, the first line data;
transmitting, by the line interleaving controller, the first line data to an image signal processor via time division multiplexing.

16. The method of claim 15, further comprising:
sequentially storing, in a second synchronizer that is different from the first synchronizer, a second row of a second frame data generated by a second image sensor;
generating a second line data based on the second row of the second frame data stored in the second synchronizer;
writing, in the memory by the second synchronizer, the second line data and transmitting a second grant signal to the line interleaving controller;
upon receiving the second grant signal, reading, by the line interleaving controller, the second line data; and
transmitting, by the line interleaving controller, the second line data to the image signal processor via the time division multiplexing,
wherein the first line data and the second line data are written to the line interleaving controller concurrently by the first synchronizer and the second synchronizer, respectively.

17. The method of claim 16, wherein the first frame data has a first frame rate and a first resolution, and the second frame data has a second frame rate, which is different from the first frame rate, and a second resolution, which is different from the first resolution.

18. The method of claim 15, wherein the sequentially storing the first row of the first frame data comprises storing the first row of the first frame data in a static random access memory (SRAM) of the first synchronizer.

19. The method of claim 15, wherein the line interleaving controller, upon receiving the first grant signal, sends a first acknowledgement signal to the first synchronizer before reading the first line data.

* * * * *